United States Patent [19]
Chudleigh, Jr.

[11] Patent Number: 6,049,150
[45] Date of Patent: Apr. 11, 2000

[54] FLYWHEEL WITH ELECTRICALLY CONTROLLED INPUT AND OUTPUT

[76] Inventor: Walter Harold Chudleigh, Jr., R.R.-1 Box 121, Springville, Pa. 18844

[21] Appl. No.: 09/271,583

[22] Filed: Mar. 18, 1999

[51] Int. Cl.[7] .............................. H02K 7/09; H02K 21/20
[52] U.S. Cl. .............................. 310/74; 310/178; 310/89; 74/572
[58] Field of Search ..................................... 310/177, 178, 310/261, 254, 89, 91, 67 R, 74, 190; 74/572, 546, 573, 574; 29/446, 450, 525

[56] References Cited

U.S. PATENT DOCUMENTS

| | | | |
|---|---|---|---|
| 4,816,709 | 3/1989 | Weldon | 310/178 |
| 5,285,699 | 2/1994 | Walls et al. | 74/572 |
| 5,721,461 | 2/1998 | Taylor | 310/268 |
| 5,932,935 | 8/1999 | Clifton et al. | 307/60 |
| 5,969,457 | 10/1999 | Clifton et al. | 310/216 |

FOREIGN PATENT DOCUMENTS 196-08-099  2/1996  Germany .

Primary Examiner—Nestor Ramirez
Assistant Examiner—Tran N Nguyen

[57] ABSTRACT

An efficient and light weight energy storage and retrieval flywheel is described. Two monopolar motor-generators are assembled in a single rotating magnetic cylinder. The ends of the cylinder are enclosed by two magnetic disks with bearings mounted on a fixed cylinder. The two end disks and the flywheel cylinder rotate as an energy storage flywheel. Two rotors are mounted within the magnetic cylinder on two output shafts which drive gear trains. Two fixed pole pieces support two field coils and provide magnetic paths for flux which crosses the rotor armatures at right angles. Two nonmagnetic contact rings and two rotating mercury contact rings provide a current path between the rotor armatures and the outer cylinder. A nonmagnetic contact disk between the two rotors closes a low resistance current loop which interacts with the magnetic flux to provide equal and opposite torques on the rotors and flywheel cylinder. The rotors rotate in the opposite direction to the flywheel. The output gear trains are connected to the rear wheels with a fixed gear ratio. The magnitude and direction of the output torque is controlled by the field coil currents and the motion between the flywheel cylinder and rotors.

2 Claims, 10 Drawing Sheets

FLYWHEEL WITH ELECTRICALLY CONTROLLED INPUT AND OUTPUT

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

This invention relates to energy storing flywheels, specifically to flywheels used in vehicles to store energy by supplying braking torque and using the stored energy to accelerate the vehicle. It has other applications not described.

An invention disclosure titled "The Constitution Car" by Walter H. Chudleigh Jr. contains some of the features of this invention. Due to lack of finding it was not patented or published and is still in a proprietary status. Other inventions do not perform the storage and recovery of energy using monopolar motor-generator technology with mercury contact rings produced by centrifugal force. The monopolar generator was the first known electrical generator invented by Michael Faraday in 1820. The 275 patent summaries listed under flywheels in the U.S. patent files do not appear to conflict with the claims in this application.

BRIEF SUMMARY OF THE INVENTION

The object of this invention is to provide a highly efficient energy recovery device which is easily produced and highly reliable for use in vehicles. Two unique monopolar direct current motor-generators are combined to provide an energy storage flywheel. The input and output torques are controlled by the magnitude and direction of the field currents. One application to provide a low pollution vehicle is described. The flywheel stores energy while providing braking torque. It uses the stored energy to accelerate the vehicle with the engine stopped to eliminate air pollution. The unit may be utilized to supply anti-skid and anti-lock braking with appropriate controls which use the electrical output and input signals of the flywheel.

Several advantages of the present invention are it's ability:

(a) to provide a device which can supply accurately controlled deceleration of a vehicle while storing the energy with high efficiency;

(b) to provide a device which can deliver calibrated acceleration of a vehicle with the engine stopped to a velocity at which the engine produces very low air pollution;

(c) to provide a device which can be added to existing vehicles or to new units without excessive cost;

(d) to provide a device with high reliability and long service life;

(e) to provide a device which can be redesigned easily for use on different size vehicles;

(f) to provide a device which can reduce air pollution due to stopping, starting and waiting in vehicles with liquid fueled engines;

(g) to provide a device which can supply higher acceleration for vehicles without increasing the engine horsepower or transmission ratio;

(h) to provide a device which can provide vehicles with improved mileage, (i) to provide a device which can reduce air pollution due to break lining wear;

(j) to provide a device which can deliver anti-slip output torque and anti-lock braking torque with appropriate control logic added which will utilize the electrical inputs and outputs of the device properly and perform the required computations and provide the necessary control signals to the flywheel.

Figure 1:
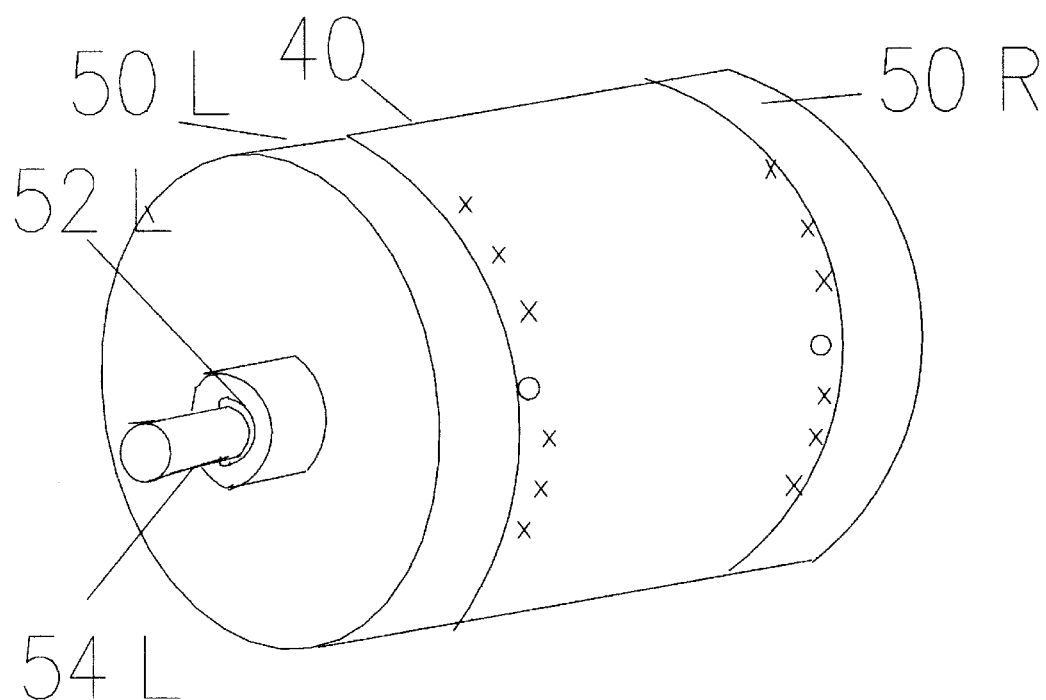
FIG. 1 shows an external view of the invention with external electrical and vacuum pipe, connections indicated.

REFERENCE NUMERALS IN DRAWINGS 10 flywheel cylinder
12 L left flywheel end disk
12 R right flywheel end disk
14 L left flywheel inner cylinder
14 R right flywheel inner cylinder
16 L left fixed pole piece shaft
16 R right fixed pole piece shaft
18 L left field coil
18 R right field coil
20 L left fixed pole piece
20 R right fixed pole piece
22 L left rotor
22 R right rotor
24 L left contact ring
24 R right contact ring
26 L left input-output shaft
26 R right input-output shaft
28 non-magnetic contact disk
32 L left rotating mercury vacuum seal
32 R right rotating mercury vacuum seal
34 L left rotor shaft bearing
34 R right rotor shaft bearing
36 L left flywheel bearing 36 R right flywheel bearing
38 rotatable inconel safety shield
40 outer fixed safety shield
42 L left PTFE vacuum seal washer
42 R right PTFE vacuum seal washer
44 left PTFE peak flux control shim
46 right PTFE peak flux control shim
48 L left sun gear
48 R right sun gear
50 L left gear train housing
50 R right gear train housing
52 L left bushing
52 R right bushing
54 L left output shaft
54 R right output shaft
All parts with the same numbers are physically interchangeable.

DETAILED DESCRIPTION OF THE INVENTION

Figure 2:
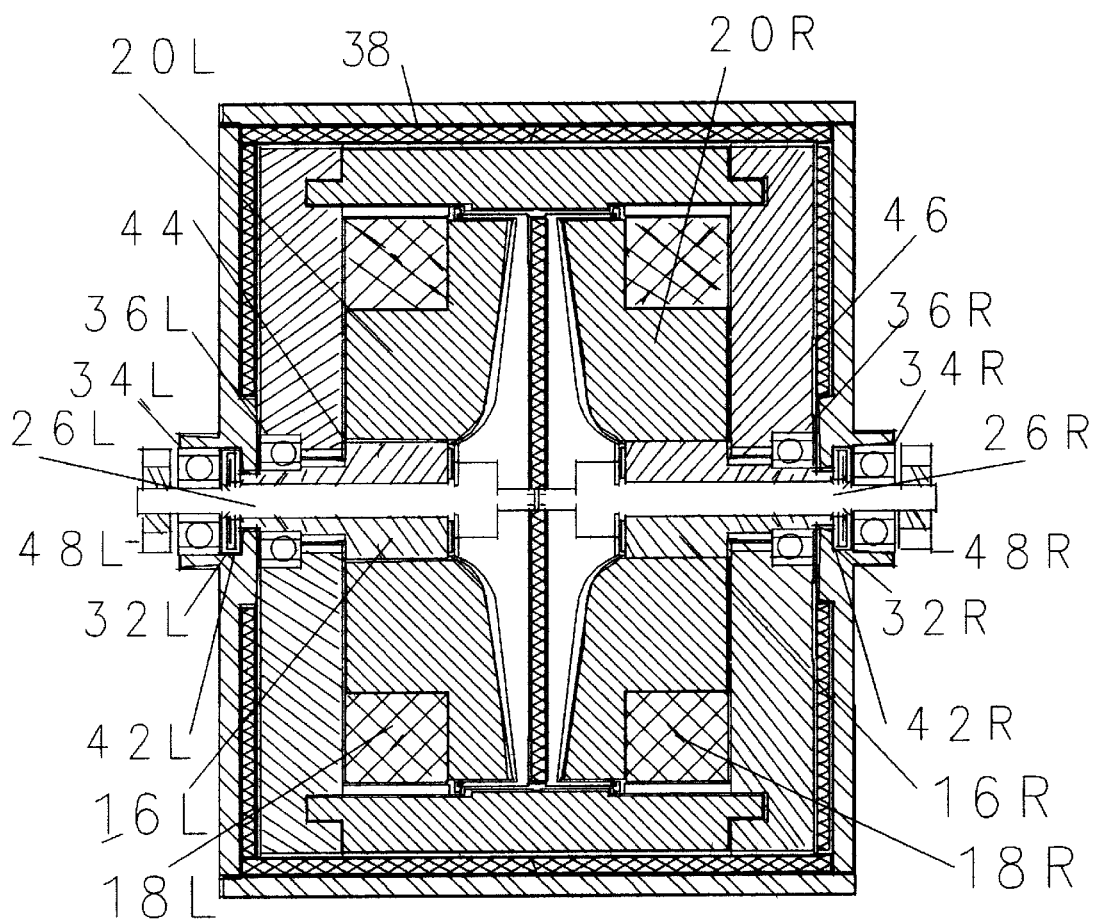
FIG. 2 shows a partial cross section thru the center of FIG. 1 lengthwise.

The preferred embodiment of the present invention is illustrated in FIG. 1 (external view) and FIG. 2 (longitudinal center section). It is a flywheel using monopolar motor-generators with input and output torque controlled electrically with high efficiency and high reliability.

Figure 3:
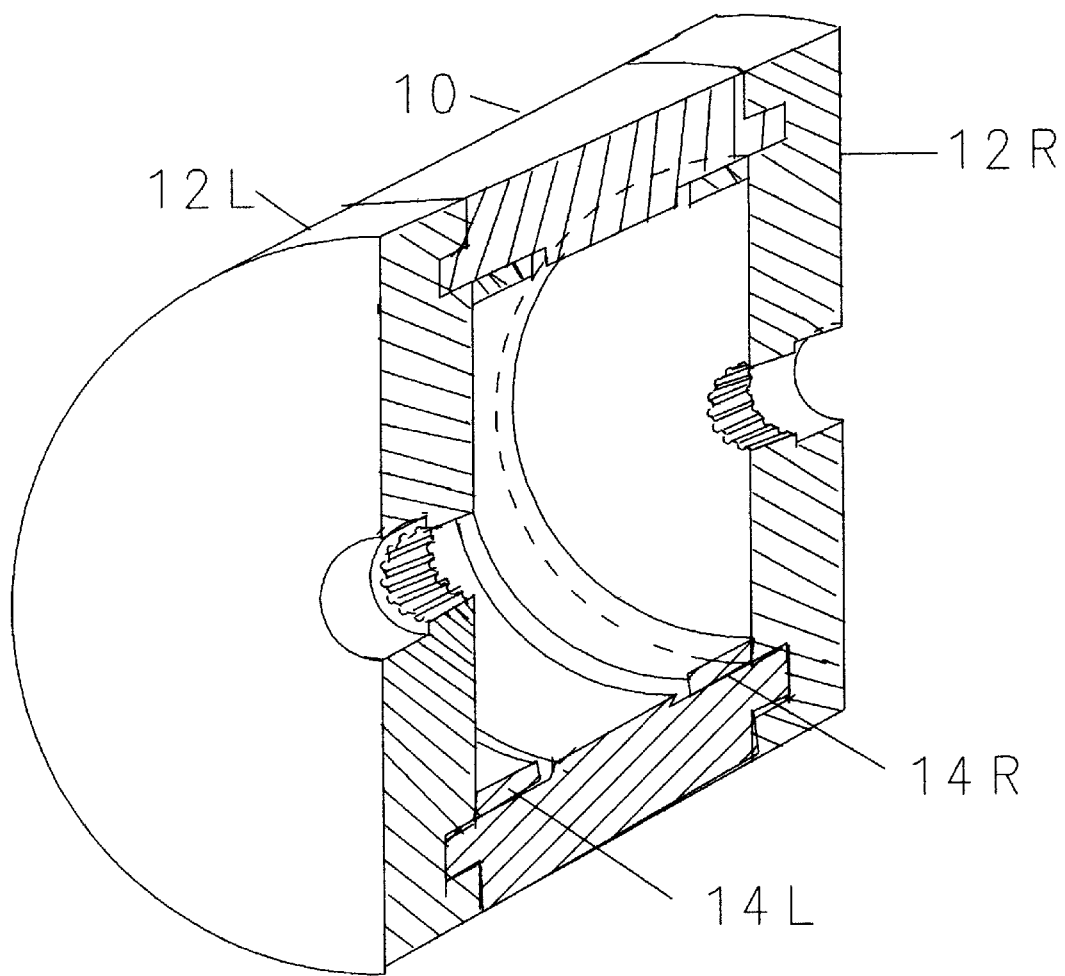
FIG. 3 shows the rotating parts of the flywheel assembly which store the energy.
Figure 6:
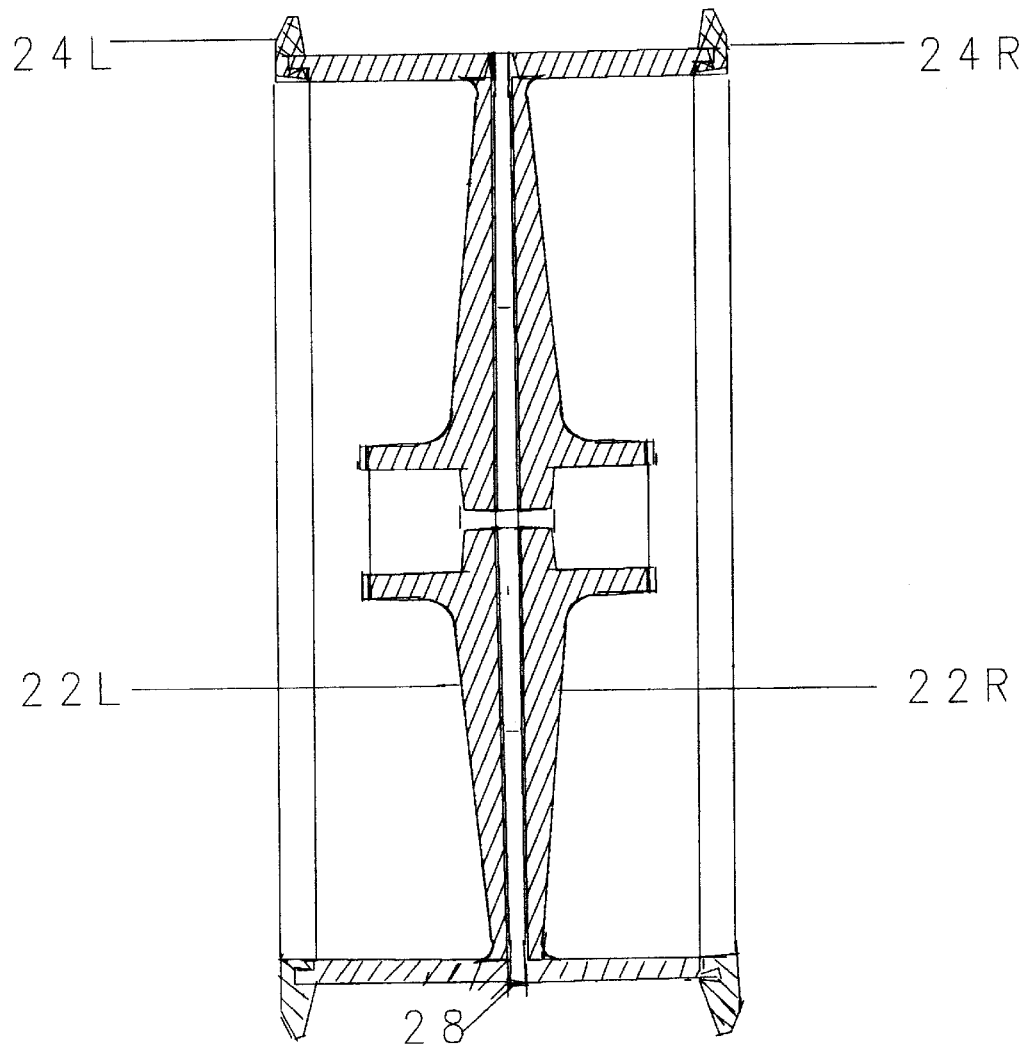
FIG. 6 shows the dual rotor assembly.

Two motor generator rotors shown in FIG. 6 are assembled inside a single cylinder 10 in FIG. 3.

The flywheel cylinder is made of a high yield strength magnetic material with a high saturation flux density and low retentivity, wherein the magnetic material is cold rolled ingot iron to provide a yield strength of twelve to fourteen thousand pounds per square centimeter. The composition and mechanical properties of ingot iron are published on pages 6-12 and 6-13 in Marks Mechanical Engineers Handbook sixth edition 1964. The flywheel cylinder has following approximate dimensions: outer diameter of 19 cm, inner diameter of 16.2 cm, a 4 cm center section with diameter of 16 cm, wherein the 4 cm center section has two axial diametrically opposite slots of 0.1 cm deep and 0.1 cm wide, the axial diametrically opposite slots are for keeping a mercury level of a rotating mercury contact ring equal on both sides of the 4 cm center section when the flywheel cylinder rotates. The preferred embodiment uses the same material for the two rotors and the two flywheel end disks shown as parts 12 L and 12 R in FIG. 3. The flywheel left and right inner cylinders parts 14 L and 14 R in FIG. 3 are also made of the same material as the outer cylinder. The two flywheel inner cylinders 14 L and 14 R fitted tight inside the flywheel cylinder, wherein the two flywheel inner cylinders are made of the same magnetic material and have approximate dimensions of 2.5 cm long and 0.3 cm thick.

The two flywheel end disks have the same outer diameter as the outer diameter of the flywheel cylinder, wherein each of the two flywheel end disks contains an annular groove fitted over one end of the flywheel cylinder to provide a magnetic path and a high mechanical strength interlocking; each of the two flywheel end disks further comprising: a first centered cylindrical surface for inserting a flywheel bearing assembly in an outer peripheral face of the first centered cylindrical surface; a second centered cylindrical surface configured with a plurality of grooves or notches located parallel to an axis of the flywheel cylinder extending from a flywheel bearing assembly mounting surface through each of the flywheel end disks to an inner peripheral face of the second centered cylindrical surface.

These five parts shown in FIG. 3 rotate on rotor bearings 36 L and 36 R, shown in FIG. 2, as a single mass to store energy in the flywheel at rotation rates up to 25,000 or more revolutions per minute. The two rotors will also rotate at rates up to 25,000 or more revolutions per minute in the opposite direction to provide input and output torque to and from the flywheel. When the rotor rotates rapidly the flywheel rotates slowly in the opposite direction.

Figure 4:
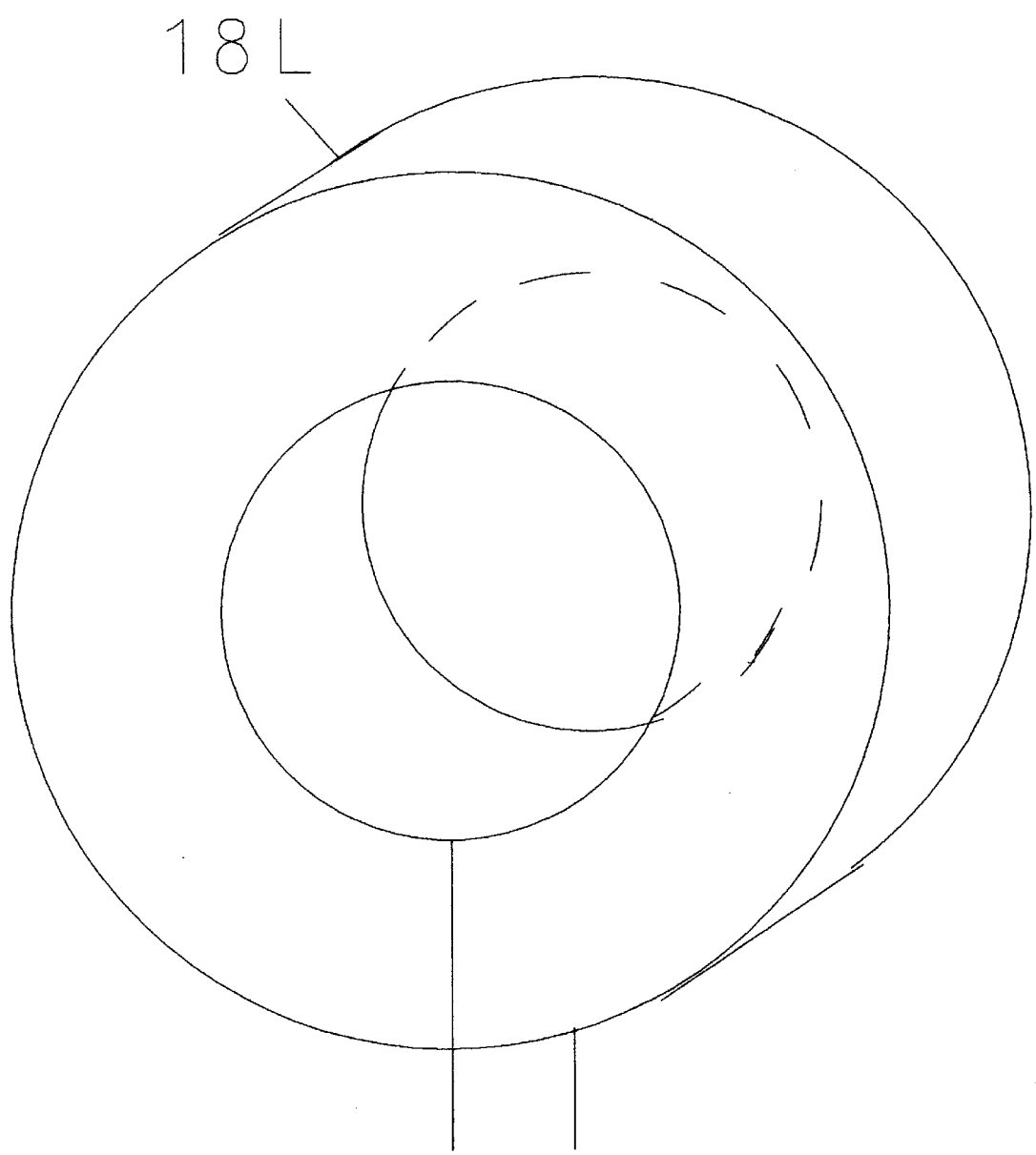
FIG. 4 shows one of the two interchangeable field coils required.

As the vehicle slows down due to the deceleration torque from the flywheel the rotor slows also since it is geared mechanically to the vehicle axle with a fixed gear ratio. The flywheel is accelerated in the opposite direction by the torque and reaches its highest rotation rate when the vehicle stops. The relative motion between the rotors and the flywheel produces controlled armature currents and torques when the magnetic flux is adjusted in magnitude and direction. The magnetic flux is controlled by choosing the direction and magnitude of the field currents in two field coils shown in FIG. 4 as parts 18 L and 18 R.

The two field coils containing winding turns of conductive material to provide a magnetomotive force to saturate a magnetic pathways within the flywheel when a current is applied from a voltage source not exceeding 12 volts; the two field coils each having an outer diameter approximately smaller than that of the two flywheel inner cylinders to allow low air friction where the two field coils mounted within the two flywheel inner cylinders, and the two field coils each having a width approximately equal to that of the two flywheel inner cylinders; the two field coils each having a centered hole for mounting within a magnetic loop and each having two wire leads to connect to an external power source.

Figure 5:
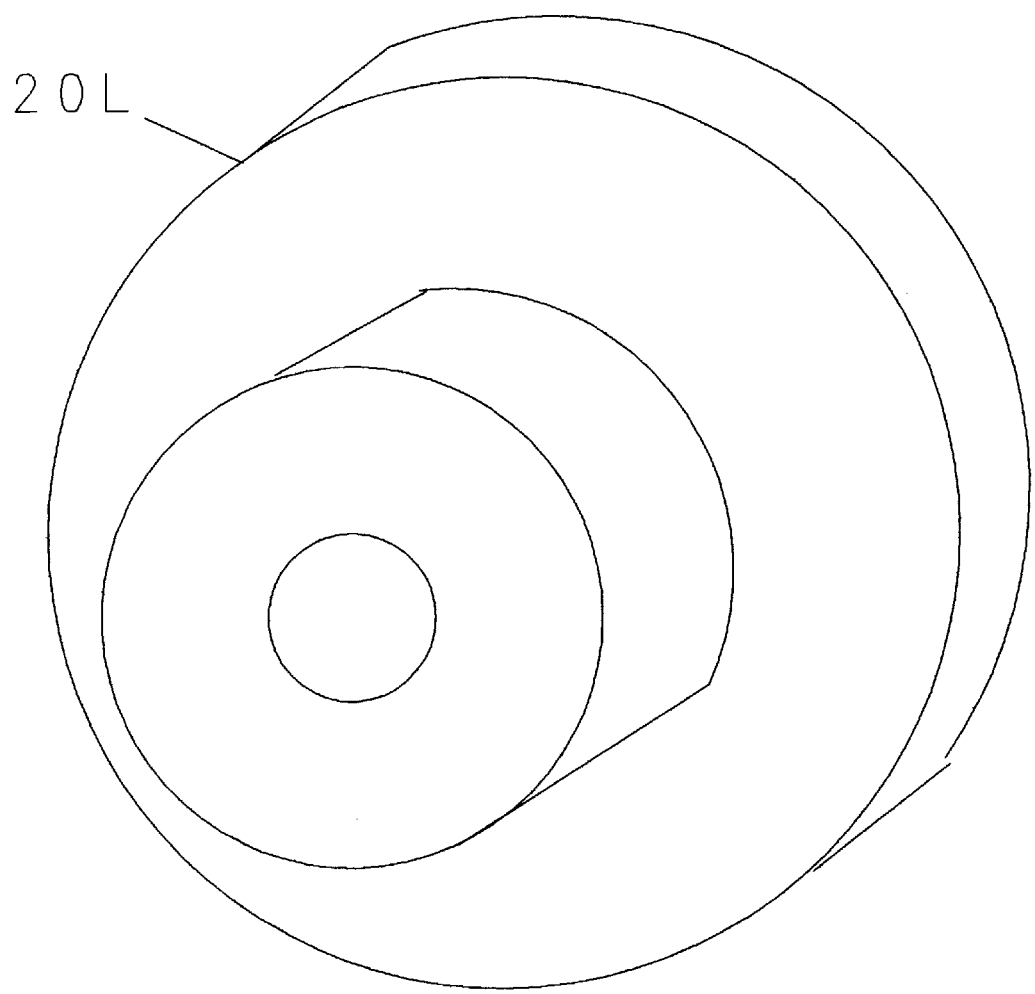
FIG. 5 shows one of the two interchangeable fixed magnetic pole pieces required.

The two fixed pole pieces parts 20 L in FIG. 5 and 20 R support the two field coils and are assembled inside the rotating flywheel cylinder as shown in the cross section of the flywheel assembly FIG. 2. The two fixed pole pieces each comprising a first cylindrical surface having the same width as that of the two field coils and a predetermined diameter to allow the field coil to slide onto the fixed pole piece with a snug fit; an outer surface of the pole piece having two wirelead grooves with predetermined dimensions to allow the wire leads to be inserted and not extend beyond the outer surface; wherein the wire-lead grooves extend radially inward from the first cylindrical surface of the fixed pole piece to a centered hole thereof, and the pole pieces extend radially outward along an inside surface of the field coils and in thermal contact with the field coils for heat exchanging; an approximate cylindrical-shaped air gap formed by a second cylindrical surface of the fixed pole piece, wherein the cylindrical-shaped air gap being parallel to the flywheel cylinder and extending axially to a first rounded point thereof; and, at the first rounded point, the cylindrical-shaped air gap tapers radially inward at an angle of 60 degrees for a predetermined distance and then changes to an angle of 85 degrees and continues to a second rounded point at a surface of the centered hole having a shoulder. This is a precisely controlled cylindrical gap provided between the outer surface of the fixed pole pieces and the inner surface of the flywheel cylinder. The cylindrical armatures of the two rotors 22 L and 22 R in FIG. 6 rotate within the air gap.

Two pole-piece shafts 16 L, 16 R (FIG. 2 and 8), each has a surface with a maximum diameter equal to that of the centered hole in the fixed pole pieces to provide a tight fit; the pole piece shaft extending from the shoulder near the center of the fixed pole pieces to near an inner edge of the flywheel bearing assembly mounting surface in the flywheel end disks, wherein the pole-piece shaft having a reduced diameter to snugly fit an inner race of a rotor bearing assembly and extending outwardly and up to an inner surface of the rotating mercury vacuum seal assembly; an input-output shaft assembly comprising at least one input-output shaft; the pole piece shaft having a centered hole having an approximate diameter of 0.08 cm which is larger than that of at least one input-output shaft, wherein the centered hole of the pole piece shaft extended through the at least one input-output shaft; wherein inner ends of the pole piece shafts have sixteen equally spaced radial slots each having width of 11.25 degrees and provided with a plurality of circumferential grooves at both inner and outer edges thereof for holding two or more turns of wire; wherein two output-wire grooves, being provided in the pole piece shafts for holding two output wires within an inner surface of the pole piece shafts, running a full length of the pole piece shafts and two holes being drilled at a 45 degree angle toward an end of the at least one inputoutput shaft near an area intersecting with the two output-wire grooves so that the two output wires passing through the at least one input-output shaft; wherein outer surfaces of the pole piece shafts each have four grooves configured the same as the two output-wire grooves located from outer ends of the pole piece shafts to the maximum diameter surface thereof, wherein the sixteen slots being radially equally spaced apart and each being configured with a predetermined depth for two or more turns of wire extend inward to an outer surface of the fixed pole piece; wherein the fixed pole piece having a first circumferential groove with a predetermined dimensions for holding two or more wires, a second circumferential groove which is similar to the first circumferential groove of the fixed pole piece is located at an outer edge of the radial slots, two of the sixteen slots are aligned with two of the four output-wire grooves and have another two grooves cutting the length of the slot, the another two grooves are aligned with the output-wire grooves in the outer surface of the fixed pole pieces to allow the field coil wires to pass under the windings in the sixteen radial slots.

The two contact rings 24 L and 24 R in FIG. 6 mounted on the ends of the rotor armatures make mechanical and electrical contact with mercury contained within the cylindrical gaps between the left and right inner cylinders 14 L and 14 R and the reduced diameter center portion of the flywheel cylinder 10. The contact rings are made of a high yield strength nonmagnetic material such as inconel which does not form an amalgam with mercury and has an expansion coefficient similar to that of the ingot iron used in the rotors.

A non-magnetic contact disk 28 in FIG. 6 is mounted between the two rotors and makes electrical contact around the circumference of the two rotors. A high conductivity current path is provided by the flywheel cylinder, the two mercury contact rings, the left and right inconel contact rings, the two rotor armature cylinders, and the inconel non-magnetic contact disk. Very large currents can flow around this current path without excessive power loss and heating of the components.

When large magnetic flux densities are created across the air gaps and armatures by passing field current thru the field coils and there is relative motion between the rotors and the flywheel cylinder, large currents will flow thru the armatures and large torques will be generated in opposite directions and of equal magnitude on the flywheel cylinder and rotors. The torque on the flywheel cylinder will be equal to the sum of the torques on the two rotors. If the magnetic field strength is the same across both rotor armatures they will have equal output torques.

The two contact rings mounted on the ends of the two rotors having the same inner diameter as the circumferential notch of the rotor; the contact rings fit tightly on the end of the armature approximately half the width of the mercury contact slot, an axial thickness of the contact rings is approximately 0.05 cm less than a width of the mercury slot at the outer edge of the rotor disk and tapers axially on an outer surface of the contact ring toward the center of the mercury slot to a width 0.2 cm less than the mercury slot at a diameter slightly less than a diameter of the mercury slot, the inner edge of the contact disk is perpendicular to the rotor armature and spaced from the inner edge of the mercury slot by 0.1 cm when mounted on the rotor armature, the contact disks are made of inconel and the outer surfaces are highly polished where they extend within the mercury slots; the inner surface of the rotor disk portion extends radially along the surface of the non-magnetic contact disk to the outer surface of the armature cylindrical portion.

The PTFE peak flux control shims 44 and 46 in FIG. 2 are placed between the flywheel end disks and the fixed pole pieces. The thickness of these shims will be adjusted to equalize and control the peak value of the flux density in the two magnetic circuits. Anti-slip and anti-lock braking can be provided by controlling the magnitude and direction of the field currents with a properly designed control system.

Figure 7:
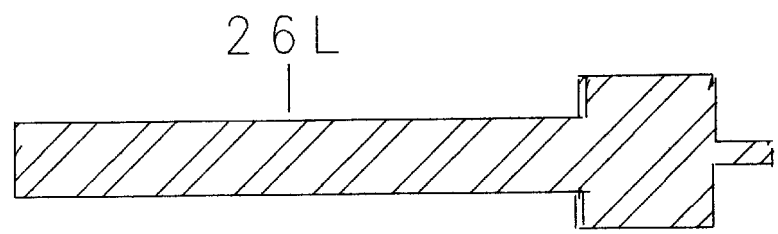
FIG. 7 shows a longitudinal cross section of the rotor shaft.

The two rotors are mounted on two high strength steel or inconel shafts and hubs 26 L in FIG. 7 and 26 R. Each of the rotors has an outer cylindrical surface with a diameter smaller than the inner diameter of the flywheel cylinder, and an inner cylindrical surface with a diameter larger than the maximum diameter of the fixed pole pieces to provide a low reluctance magnetic path from the fixed pole piece to the flywheel cylinder through the rotor cylinder with predetermined clearance to allow for expansion and contraction of the rotors, an outer edge of the rotor disk portion being provided with notch to allow a contact ring to slip on, the rotor disk portion with an inner surface extends axially inwardly beyond the rounded point on the fixed pole piece where the fixed pole piece extends radially inward making an angle of 86 degrees with the rotor disk portion and follows a contour—of the fixed pole piece allowing clearance for expansion and contraction while maintaining a gap with an inner end of the pole piece shaft where the inner surface of the rotor disk portion turns radially inward at 90 degrees to the pole piece shaft and extends to a hub on the rotor shaft, a radial surface of the rotor is provided with sixteen notches similar to those in the inner end of the pole piece shaft without the circumferential slots , the rotor mounts on the at least one input-output shaft with a tight fit for maintaining high torque without slipping at rotation rates up to 30,000 revolutions per minute, the rotor inner surface matches that of an exterior of the at least one input-output shaft. The sun gears of the two output gear trains are mounted on the rotor shafts. The friction between the non-magnetic inconel contact disk and the rotors provides an anti-slip torque while allowing different rotation rates between the two output shafts as required to allow proper operation of the vehicles around turns and with slightly different wheel sizes. The axial force required to maintain the friction is supplied by a duplex pair of precision high speed bearings with a controlled axial preload adjustment shown as parts 34 L and 34 R in FIG. 2 mounted between the rotor shaft and the outer fixed safety shield 40 in FIG. 1.

In order to reduce air friction the rotatable inconel safety shield 38 in FIG. 2 will provide a vacuum envelope around the flywheel. The rotating mercury vacuum seats 32 L and 32 R in FIG. 2 provide a vacuum seal between the rotor shafts 26 L and 26 R and the outer fixed safety shield 40 in FIG. 1. The vacuum seal is provided by a ring of mercury which surrounds an inconel washer which rotates with the shaft. When the shaft is rotating the centrifugal force on the mercury seals the gap between the washer and the outer safety shield. When the shaft is not rotating the vacuum seal is maintained by thin PTFE washers 42 L and 42 R in FIG. 2 between the mercury vacuum seals 32 L and 32 R and the rotor bearings 34 L and 34 R in FIG. 2 which seal due to the pressure of the atmosphere pressing them against the mercury seals. The shafts with a 0.5 cm diameter 0.6 cm long extension on the inner end extends through the rotor; the diameter of the shaft increases to 2 cm for an axial distance of 1.2 cm where the diameter decreases to slightly over 1.0 cm and extends to the inner edge of the rotating mercury vacuum seal assembly where the diameter changes to 1.0 cm and extends through the rotating mercury vacuum seal assembly, a rotor bearing assembly, and a sun gear, the radial surface of the 2 cm diameter portion of the at least one input-output shafts has sixteen shallow grooves of 11.25 degrees wide which are aligned with grooves similar to that in the outer edge of the rotor.

Figure 8:
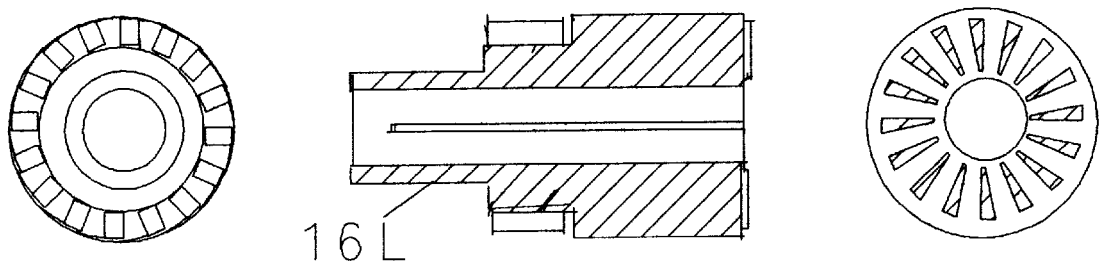
FIG. 8 shows a longitudinal cross section of the left fixed pole piece shaft and left and right end views of the shaft.

The flywheel bearings 36 L and 36 R in FIG. 2 are mounted between the fixed pole piece shafts 16 L in FIG. 8 and 16 R and the outer edges of the flywheel end disks. They are a duplex pair with a small axial preload. All of the bearings will be factory sealed in grease. They will have ceramic balls to provide low friction at high rotation rates and long bearing life.

The outer fixed safety shield 40 in FIG. I fits on the splined end of the fixed pole piece shaft. The material and thickness of the outer fixed safety shield will be determined after suitable testing of the flywheel assembly. It could be metal, kevlar, fused silica or carbon fibre or a combination of several of them. The design will be determined by safety and cost considerations. Outer ends of the outer fixed safety shield contain three mounting shafts located at 120 degrees to hold the flywheel bearings and planet gears used in a planetary gear train assembly, and two cylindrical mounting surfaces for a gear train housing assembly.

Two holes will be provided for connecting a vacuum pump at each end of the outer fixed safety shield 40 as shown in FIG. 1. Six electrical connections will be provided at each end of the outer shield 40 as shown in FIG. 1. Holes thru the shield 40 for the wires from within the flywheel are aligned with grooves in the fixed pole piece shaft. Two of the six external connections are for the field coils, two connect to the flywheel cylinder rotation rate pickup coil, and two connect to the rotor rotation rate pickup coil. Similar connections will be provided on each end. The flywheel cylinder rotation rate pickup coils will be redundant to insure the reliability of the flywheel rotation rate measurements.

The outer fixed safety shield has three short mounting shafts in each end located at 120 degree spacing for installing three bearings and three planetary gears for the output gear train. The two sun gears 48 L and 48 R in FIG. 2 on the rotor shafts drive planetary gear trains similar to those used in many automotive transmissions. The example of a vehicle equipped with the flywheel described in this document represents one of many possible uses for the flywheel. This example system utilizes a gear reduction ratio of seven at the output of the flywheel. A second planetary gear train shown in FIG. 9 in each rear wheel has a gear reduction ratio of 3.75. The reduction ratio from the flywheel rotors to each wheel is 26.25.

The gear train housings 50 L and 50 R in FIG. I are mounted at each end of the outer fixed safety shield. They each provide a cylindrical mounting surface surrounded by a vibration isolation material. Suitable mounting clamps which surround the vibration isolation material support the flywheel assembly in the vehicle. The mounting cylinders contain bushings 52 L in FIG. I and 52 R and support the output shafts 54 L in FIG. I and 54 R from the gear trains.

Figure 9:
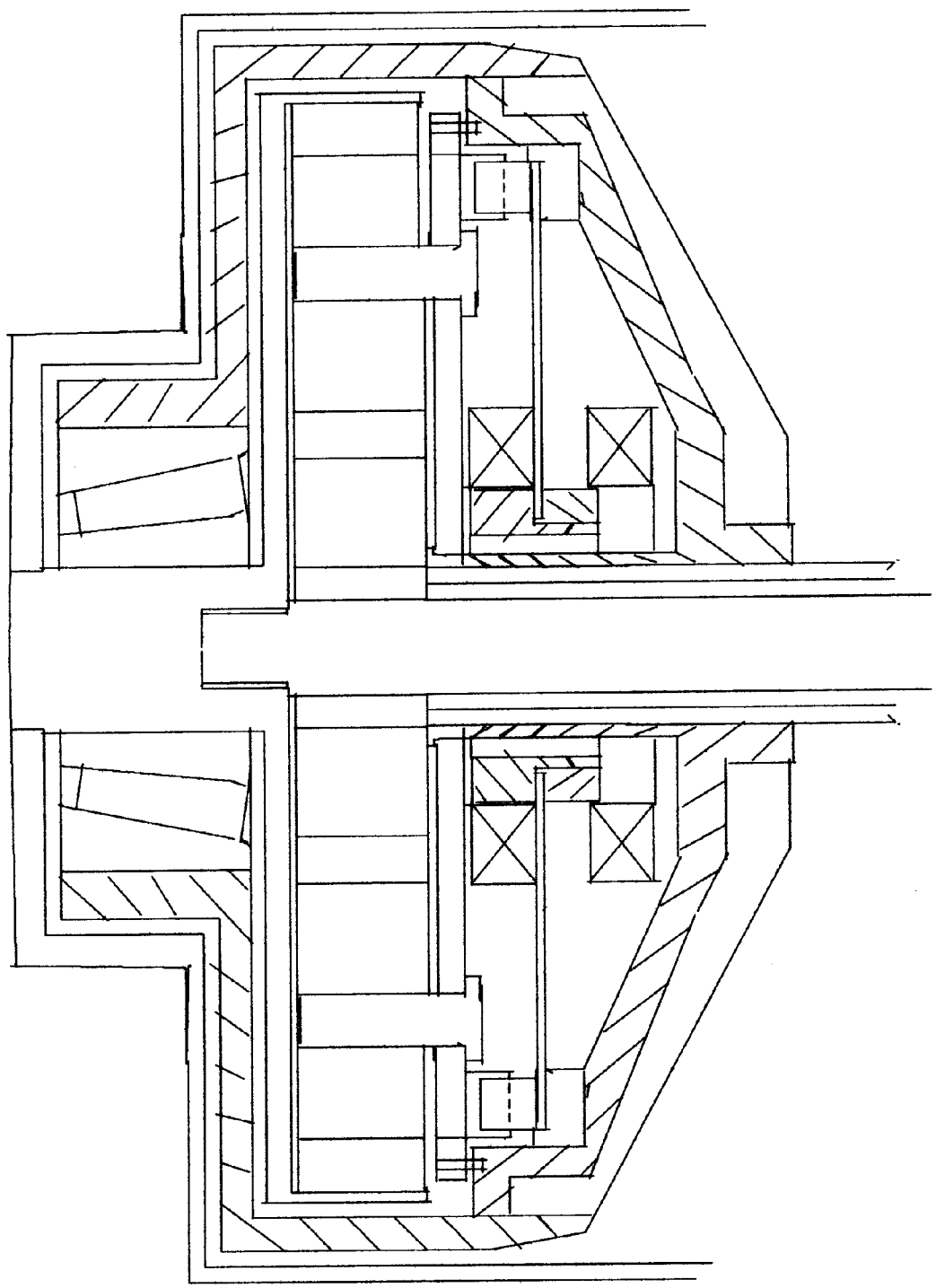
FIG. 9 shows the longitudinal cross section of a sample wheel drive system showing the drive shaft, planetary gear train, one way clutch, and electrically operated zero velocity clutch on the planet carrier.
Figure 10:
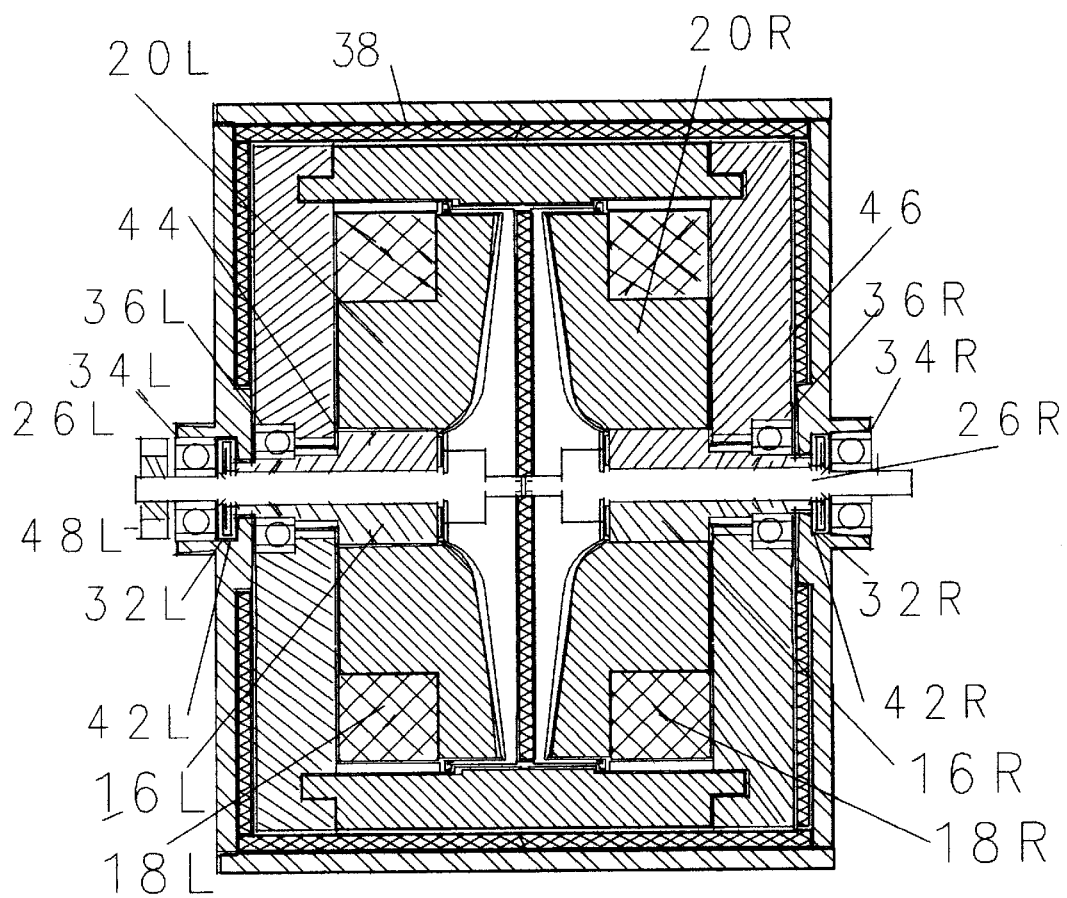
FIG. 10 shows the alterantive embodiment of the flywheel with one rotor therein.
Figure 11:
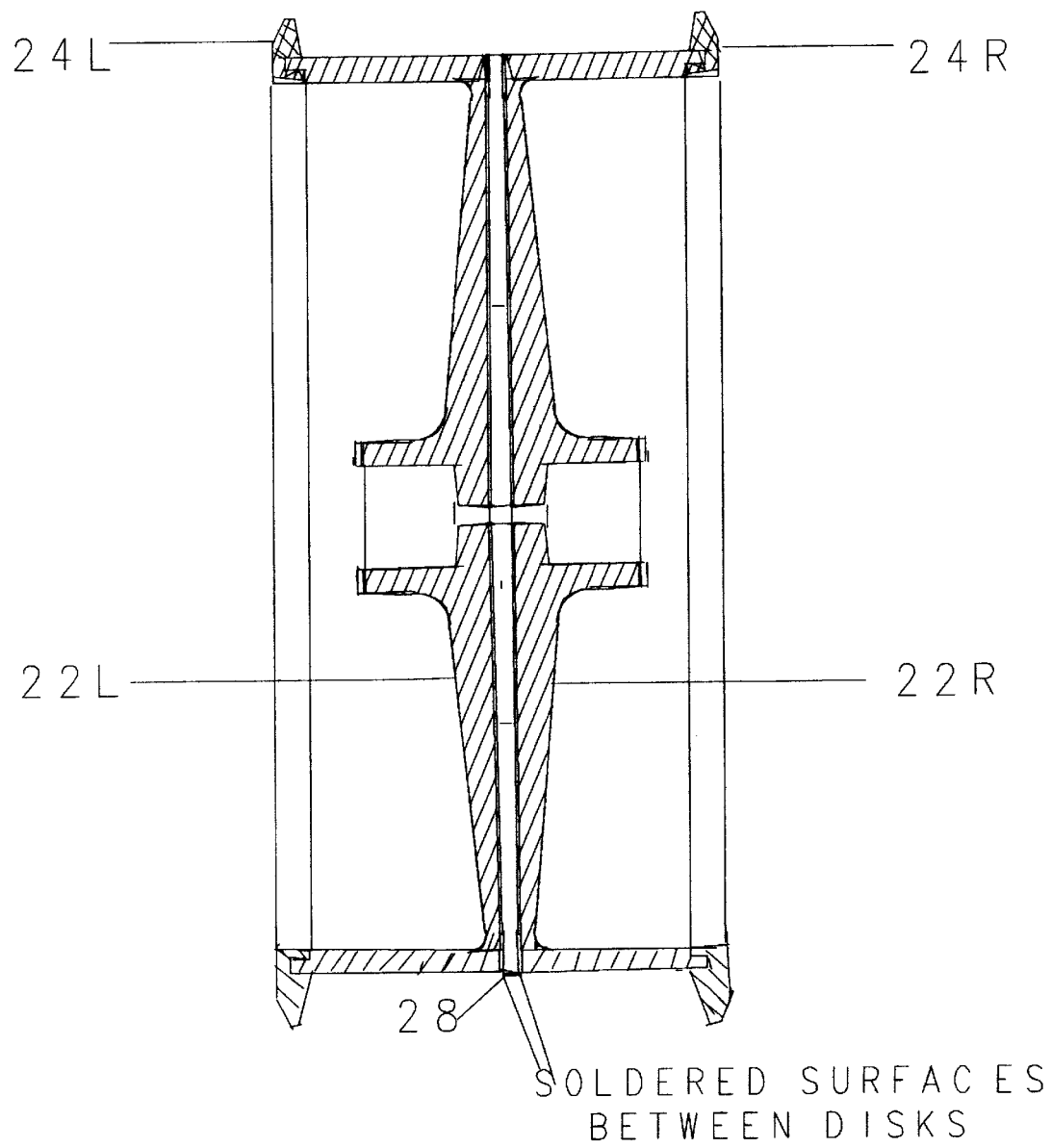
FIG. 11 shows the detail of the flywheel with rotor disk assembly.

The example shown in FIG. 9 also includes an electric zero velocity clutch and an unidirectional clutch. They provide the ability to electrically disengage the flywheel from the wheels when it is not required for providing braking torque and to re-engage it rapidly when it is needed. This capability allows the flywheel and the two rotors to operate at low rotational rates except when they are required for storing braking energy and applying it to accelerate the vehicle. This minimizes friction losses and maximizes the life and reliability of the flywheel in vehicles which spend a significant amount of time on highways where stops are infrequent. Vehicles which are used for urban driving only will not require the clutches and brake which will allow a significant cost reduction. In an addition to eliminating air pollution due to idling engines and improving the efficiency of electric vehicles the flywheel system will provide better gas mileage in urban areas. This will cause an additional reduction in ozone depleting gases and oil imports. In hilly terrain the flywheel may be used to store energy on the downgrades and deliver torque on the upgrades to improve highway performance and reduce wear on the brakes. A low cost typical flywheel design could store the energy recovered in a hundred foot elevation change.

ALTERNATE DESIGN

An alternate design consists of the design described above modified by providing a single rotor with an armature cylinder on both sides and a single output shaft. The center contact disk would be eliminated. Two field coils and two fixed pole pieces would be used to keep the electrical and mechanical symmetry. Separate units would be used on two wheels. The axles could be shorter with this design and the axes of the flywheels could be at right angles to the axles if desired. A vertical mounting provides lower gyroscopic torque when the vehicle is turning.

OPERATION

The flywheel with electrically controlled input and output torque may be controlled with many different electrical and electronic control systems. The output signals from windings on the fixed pole piece shafts between the shaft and the rotor hub and between the shaft and the flywheel end disks indicating the rotation rates of the flywheel cylinder and rotors are digital pulses. By counting the pulses for a fixed time interval the rotation rate will be indicated by the counter total. A computer may be programmed to use the rotation information along with control signals from the vehicle operator. Using the foot brake pedal and accelerator pedal with properly designed electrical pick off the desired deceleration and acceleration of the vehicle may be accurately controlled by the computer in response to the operator signals.

While providing braking torque the flywheel cylinder rotation rate will increase. When a preset value of rotation rate is reached the fuel supply to the engine will be stopped by a signal from the computer. The engine fuel will remain off until the operator calls for acceleration and the velocity reaches a preset value at which the engine operates with low pollution and the flywheel cylinder rotation rate is below a preset value stored in the computer. A pushbutton will be supplied for the operator to signal the computer that it should switch to the highway mode with the flywheel rotors not connected to the wheels. The computer will switch to highway mode automatically when the rotors reach the maximum safe rotation rate preset in the computer.

When the flywheel cylinder approaches the maximum rotation rate preset in the computer a warning signal will be supplied to the operator. The operator will depress the brake pedal with more force which will apply the normal friction brakes. The computer will reduce the output torque from the flywheel to zero as the friction brake torque increases to guarantee that the preset maximum rotation rate is not exceeded.

What I claim as my invention is:

1. A flywheel comprising:

(A) a flywheel cylinder made of a high yield strength magnetic material with a high saturation flux density and low retentivity, wherein said magnetic material is cold rolled ingot iron; said flywheel cylinder has following approximate dimensions: outer diameter of 19 cm, inner diameter of 16.2 cm, a 4 cm center section with diameter of 16 cm, wherein said 4 cm center section has two axial diametrically opposite slots of 0.1 cm deep and 0.1 cm wide, said axial diametrically opposite slots are for keeping a mercury level of a rotating mercury contact assembly equal on both sides of said 4 cm center section when said flywheel cylinder rotates;

(B) two flywheel inner cylinders fitted tight inside said flywheel cylinder, wherein said two flywheel inner cylinders made of the same said magnetic material and having approximate dimensions of 2.5 cm long and 0.3 cm thick;

(C) two flywheel end disks having the same outer diameter as said outer diameter of said flywheel cylinder, wherein each of said two flywheel end disks comprising an annular groove fitted over one end of said flywheel cylinder to provide a magnetic path and a high mechanical strength; each of said two flywheel end disks further comprising: a first centered cylindrical surface for inserting a flywheel bearing assembly in an outer peripheral face of said first centered cylindrical surface; a second centered cylindrical surface configured with a plurality of grooves or notches located parallel to an axis of said flywheel cylinder extending from a flywheel bearing assembly mounting surface through each of said flywheel end disks to an inner peripheral face of said second centered cylindrical surface;

(D) two field coils containing winding turns of conductive material to provide a magnetomotive force to saturate a magnetic pathway within said flywheel when a current is applied from a voltage source not exceeding 12 volts; said two field coils each having an outer diameter approximately smaller than that of said two flywheel inner cylinders to allow low air friction with said two field coils mounted within said two flywheel inner cylinders, and said two field coils each having a width approximately equal to that of said two flywheel inner cylinders; said two field coils each having a centered hole for mounting within a magnetic loop and each having two wire leads to connect to an external power source;

(E) two fixed pole pieces each comprising a first cylindrical surface having the same width as that of said two field coils and a predetermined diameter to allow said field coil to slide onto said fixed pole piece with a snug fit; an outer surface of said pole piece having two wire-lead grooves with predetermined dimensions to allow said wire leads to be inserted and not extend beyond said outer surface; wherein said wire-lead grooves extend radially inward from said first cylindrical surface of said fixed pole piece to a centered hole thereof, and said pole pieces extend radially outward along an inside surface of said field coils and in thermal contact with said field coils for heat exchanging; an approximate cylindrical-shaped air gap formed by a second cylindrical surface of said fixed pole piece, wherein said cylindrical-shaped air gap being parallel to said flywheel cylinder and extending axially to a first rounded point thereof, and, at said first rounded point, said cylindrical-shaped air gap tapers radially inward at an angle of 60 degrees for a predetermined distance and then changes to an angle of 85 degrees and continues to a second rounded point at an surface of said centered hole having a shoulder;

(F) two pole-piece shafts each having a surface with a maximum diameter equal to that of said centered hole in said fixed pole pieces to provide a tight fit; said pole piece shaft extending from said shoulder near the center of said fixed pole pieces to near an inner edge of said flywheel bearing assembly mounting surface in said flywheel end disks, wherein said pole-piece shaft having a reduced diameter to snugly fit an inner race of a rotor bearing assembly and extending outwardly and up to an inner surface of said rotating mercury vacuum seal assembly; an input-output shaft assembly comprising at least one input-output shaft; said pole piece shaft having a centered hole having an approximate diameter of 0.08 cm which is larger than that of at least one input-output shaft, wherein said centered hole of said pole piece shaft extended through said at least one input-output shaft; wherein inner ends of said pole piece shafts have sixteen equally spaced radial slots each having width of 11.25 degrees and provided with a plurality of circumferential grooves at both inner and outer edges thereof for holding two or more turns of wire; wherein two output-wire grooves, being provided in said pole piece shafts for holding two output wires within an inner surface of said pole piece shafts, running a full length of said pole piece shafts and two holes being drilled at a 45 degree angle toward an end of said at least one input-output shaft near an area intersecting with said two output-wire grooves so that said two output wires passing through said at least one input-output shaft; wherein outer surfaces of said pole piece shafts each have four grooves configured the same as said two output-wire grooves located from outer ends of the pole piece shafts to said maximum diameter surface thereof, wherein said sixteen slots being radially equally spaced apart and each being configured with a predetermined depth for two or more turns of wire extend inward to an outer surface of said fixed pole piece; wherein said fixed pole piece having a first circumferential groove with a predetermined dimensions for holding two or more wires, a second circumferential groove which is similar to said first circumferential groove of said fixed pole piece is located at an outer edge of the radial slots, two of said sixteen slots are aligned with two of said four output-wire grooves and have another two grooves cutting the length of the slot, said another two grooves are aligned with said output-wire grooves in the outer surface of the fixed pole pieces to allow said field coil wires to pass under the windings in the said sixteen radial slots, (G) a rotor assembly comprising at least one rotor made of said magnetic material; said at least one rotor having an outer cylindrical surface with a diameter smaller than the inner diameter of the flywheel cylinder, and an inner cylindrical surface with a diameter larger than said maximum diameter of said fixed pole pieces to provide a low reluctance magnetic path from said fixed pole piece to said flywheel cylinder through the rotor cylinder with predetermined clearance to allow for expansion and contraction of said at least one rotor, an outer edge of said rotor disk portion being provided with notch to allow a contact ring to slip on, said rotor disk portion with an inner surface extends axially inwardly beyond the rounded point on the fixed pole piece where said fixed pole piece extends radially inward making an angle of 86 degrees with said rotor disk portion and follows a contour of the fixed pole piece allowing clearance for expansion and contraction while maintaining a gap with an inner end of the pole piece shaft where said inner surface of said rotor disk portion turns radially inward at 90 degrees to the pole piece shaft and extends to a hub on the rotor shaft, an radial surface of said rotor is provided with sixteen notches similar to those in the inner end of the pole piece shaft without the circumferential slots, the rotor mounts on said at least one input-output shaft with a tight fit for maintaining high torque without slipping at rotation rates up to 30,000 revolutions per minute, said rotor inner surface matches that of an exterior of said at least one input-output shaft;

(J) said at least one input-output shafts with a 0.5 cm diameter 0.6 cm long extension on the inner end extends through the rotor; said diameter of said at least one input-output shafts increases to 2 cm for an axial distance of 1.2 cm where said diameter decreases to slightly over 1.0 cm and extends to the inner edge of the rotating mercury vacuum seal assembly where said diameter changes to 1.0 cm and extends through the rotating mercury vacuum seal assembly, a rotor bearing assembly, and a sun gear, the radial surface of the 2 cm diameter portion of said at least one input-output shafts has sixteen shallow grooves of 11.25 degrees wide which are aligned with grooves similar to that in the outer edge of the rotor;

(K) said mercury vacuum seal assembly comprising two rotating mercury vacuum seals mounted on said at least one input-output shaft with their outer surface seated in the outer fixed safety shield next to said rotor bearing assembly, (L) two thin plastic washers which are mounted next to the outer face of the mercury vacuum seals to hold the mercury vacuum seals when the rotor shaft is in a stationary state;

(M) said rotor bearing assembly comprising two rotor bearings between the rotor shaft and the outer safety shield for supporting an operation at 30,000 revolutions per minute;

(N) said flywheel bearing assembly comprising two flywheel bearings between the fixed pole piece shafts and the flywheel end disks for supporting an operation at 30,000 revolutions per minute, (O) two plastic peak flux control shims mounted between the fixed pole pieces and the flywheel end disks to adjust the reluctance of the magnetic circuit, (P) one rotatable inconel safety shield mounted inside the outer safety shield on two cylindrical surfaces sealed with vacuum grease to hold said mercury vacuum seal during a stationary state;

(Q) one outer fixed safety shield fitted on the ends of the fixed pole piece shafts and containing two holes for evacuating the interior of the rotatable inconel safety shield, and six holes in each end for electrical wires to pass through, outer ends of said outer fixed safety shield contain three mounting shafts located at 120 degrees to hold the flywheel bearings and planet gears used in a planetary gear train assembly, and two cylindrical mounting surfaces for a gear train housing assembly;

(R) said planetary gear train assembly comprising two planetary gear trains each having a sun gear, three planet gears mounted on flywheel bearings, and an internal gear with an output drive shaft, all mounted inside a gear train housing assembly;

(S) said gear train housing assembly comprising two gear train housings which mount on the fixed safety shield and provide cylindrical mounting surfaces surrounded by a vibration absorbing material which are used to mount the flywheel assembly on the vehicle frame;

(T) two bushings centered in the mounting cylinder and supporting said at least one input-output shaft, (U) said mercury ring assembly comprising two fluid mercury rings approximately fill the two mercury slots when rotating.

2. The flywheel according to claim 1 wherein said rotor assembly further comprising another rotor, and two contact rings mounted on the ends of the two rotors having the same said inner diameter and said circumferential notch of said rotor; said contact rings fit tightly on the end of the armature approximately half the width of a slot depth of said mercury vacuum contact, an axial thickness of the contact rings is approximately 0.05 cm less than a width of said mercury slot at the outer edge of the rotor disk and tapers axially on an outer surface of said contact ring toward the center of the mercury slot to a width 0.2 cm less than the mercury slot at a diameter slightly less than a diameter of the mercury slot, the inner edge of the contact ring is perpendicular to the rotor armature and spaced from the inner edge of the mercury slot by 0.1 cm when mounted on the rotor armature, the contact rings are made of inconel and the outer surfaces are highly polished where they extend within the mercury slots; the inner surface of the rotor disk portion extends radially along the surface of the non-magnetic contact disk to the outer surface of the armature cylindrical portion; and said input-output shaft assembly further including another input-output shaft.

* * * * *